(12) United States Patent
Li et al.

(10) Patent No.: US 12,487,013 B2
(45) Date of Patent: Dec. 2, 2025

(54) AMBIENT TEMPERATURE BAROCALORIC REFRIGERATING MACHINE BASED ON BAROCALORIC EFFECT

(71) Applicant: INSTITUTE OF METAL RESEARCH, CHINESE ACADEMY OF SCIENCES, Liaoning (CN)

(72) Inventors: Bing Li, Liaoning (CN); Ruiqi Song, Liaoning (CN); Zhidong Zhang, Liaoning (CN)

(73) Assignee: INSTITUTE OF METAL RESEARCH, CHINESE ACADEMY OF SCIENCES, Liaoning (CN)

( * ) Notice: Subject to any disclaimer, the term of this patent is extended or adjusted under 35 U.S.C. 154(b) by 38 days.

(21) Appl. No.: 18/291,963

(22) PCT Filed: Jan. 19, 2022

(86) PCT No.: PCT/CN2022/072656
§ 371 (c)(1),
(2) Date: Jan. 25, 2024

(87) PCT Pub. No.: WO2023/010816
PCT Pub. Date: Feb. 9, 2023

(65) Prior Publication Data
US 2025/0102200 A1    Mar. 27, 2025

(30) Foreign Application Priority Data

Aug. 4, 2021   (CN) .......................... 202110889207.9

(51) Int. Cl.
*F25B 23/00*     (2006.01)
*F25B 41/20*     (2021.01)
*F25B 49/00*     (2006.01)

(52) U.S. Cl.
CPC .............. *F25B 23/00* (2013.01); *F25B 41/20* (2021.01); *F25B 49/00* (2013.01); *F25B 2300/00* (2013.01)

(58) Field of Classification Search
CPC ......... F25B 23/00; F25B 2300/00; C09K 5/14
See application file for complete search history.

(56) References Cited

U.S. PATENT DOCUMENTS

| 4,143,649 A | * | 3/1979 | Foti ..................... A61F 9/00736 |
| | | | 600/555 |
| 10,018,385 B2 | * | 7/2018 | Radermacher ........... C09K 5/10 |
| 10,119,059 B2 | * | 11/2018 | Cui ....................... F03G 7/0614 |

FOREIGN PATENT DOCUMENTS

| CN | 108562061 A | 9/2018 |
| CN | 108954901 A | 12/2018 |

(Continued)

Primary Examiner — Lionel Nouketcha
(74) Attorney, Agent, or Firm — NKL Law; Allen Xue

(57) ABSTRACT

An ambient temperature barocaloric refrigerating machine has a high-precision high-pressure electric injection pump, a barocaloric element, heat exchange fluid, a cold end heat exchanger and a hot end heat exchanger. The phenomena of heat release after pressurization and heat absorption after depressurization are generated due to phase change through a barocaloric medium under the action of the high-pressure injection pump. The heat exchange fluid flows back and forth between the barocaloric refrigerators and exchanges heat and cold. The high-precision high-pressure electric injection pump provides pressure for the barocaloric refrigeration cycle. The pressurization oil is also used as the heat exchange fluid and in direct contact with a sample. Pressure-driven heat and cold are directly brought into the hot end heat exchanger and the cold end heat exchanger to complete the cycle, thereby reducing the heat loss.

8 Claims, 4 Drawing Sheets

(56) References Cited

FOREIGN PATENT DOCUMENTS

| CN | 109140821 A | 1/2019 |
| CN | 110285516 A | 9/2019 |
| CN | 113587489 A | 11/2021 |

* cited by examiner

AMBIENT TEMPERATURE BAROCALORIC REFRIGERATING MACHINE BASED ON BAROCALORIC EFFECT

TECHNICAL FIELD

The present invention relates to the technical field of refrigerating machines, in particular to a ambient temperature barocaloric refrigerating machine based on a barocaloric effect.

BACKGROUND

In modern society, the refrigeration technology has penetrated into various production technologies and scientific fields. However, the common widely-used refrigerants such as chlorofluorocarbons (CFC) and hydrochlorofluorocarbons (HCFC) used in the traditional gas compression technology have varying degrees of damage to the ozone layer, and do not conform to the environmental protection, green and energy-saving health concept of the current big environment.

Under this background, the development and research of environment-friendly refrigeration technology become an important research direction for innovation of the refrigeration technology. At present, there are novel solid-state research refrigeration technologies in the development stage, which are considered to be one of the refrigeration modes most likely to replace the traditional gas compression because of the advantage of zero global warming potential (GWP). Wherein the principle of the solid-state refrigeration technology can be divided as follows based on different thermal effects: magnetocaloric effect, electrocaloric effect, thermoelastic effect and barocaloric effect. There is a huge gap between the performance of the solid phase change refrigeration material and that of the liquid refrigerant, which becomes one of the bottlenecks that limit the application of this technology.

The barocaloric refrigeration effect is more extensive in material selection. Recently, scientists have found that the highest isothermal entropy change in plastic crystal material can reach 687 J $kg^{-1}K^{-1}$, which is higher than the traditional solid refrigeration material by an order of magnitude, and close to the traditional commercial liquid refrigerant. It is convenient to achieve driving conditions, easy to obtain the material, cheaper in price and convenient to achieve application. In this technology, when the pressure is applied to the plastic crystal material or the pressure field is removed, the material may generate the heat absorption or heat release phenomenon due to phase change, so as to conduct heat exchange with the load to complete the refrigeration or heating effect. This process is called the barocaloric effect. The thermodynamic cycle process of the barocaloric effect is consistent with that of the reverse Carnot cycle. Based on the generation of the material having high isothermal entropy change under ambient temperature conditions, it is necessary to develop corresponding refrigeration equipment.

SUMMARY

The purpose of the present invention is to provide a ambient temperature barocaloric refrigerating machine based on a barocaloric effect. The refrigerating machine uses a high-precision high-pressure injection pump to provide the corresponding phase change pressure conditions for the material under the ambient temperature ambient temperaturethrough the characteristics of heat absorption and heating after pressurization and cooling and heat release after depressurization in barocaloric material based on the principle of the barocaloric thermal effect to obtain cold and heat in the system, and uses fluid to circulate through the system to bring the heat to a high temperature heat source end and to bring the cold to a cold-end load end to complete the entire refrigeration cycle.

To achieve the above purpose, the present invention adopts the following technical solution:

A ambient temperature barocaloric refrigerating machine based on a barocaloric effect comprises a high-precision high-pressure electric injection pump, a barocaloric element, heat exchange fluid, a cold end heat exchanger and a hot end heat exchanger; wherein:

the barocaloric element is a tubular structure having a cylindrical cavity body; a solid refrigerant is arranged in the cavity body; the upper part of a side wall of the tubular structure is provided with a hot end liquid outlet pipe and a cold end liquid outlet pipe; the lower part of the side wall is provided with a hot end liquid inlet pipe and a cold end liquid inlet pipe; and the middle part of the side wall is provided with an oil inlet, wherein: the hot end liquid outlet pipe, the cold end liquid outlet pipe, the hot end liquid inlet pipe and the cold end liquid inlet pipe are provided with pressure control valves;

the high-precision high-pressure electric injection pump is used for providing constant pressure for the barocaloric element; an oil filling pipe at the upper end of the injection pump is connected with the oil inlet in the barocaloric element for injecting pressurization oil into the cavity body of the barocaloric element; the oil is also used as the heat exchange fluid and in direct contact with the solid refrigerant;

the hot end heat exchanger: the hot end liquid outlet pipe of the barocaloric element is connected with a liquid inlet of the hot end heat exchanger, and a liquid outlet of the hot end heat exchanger is connected with the hot end liquid inlet pipe of the barocaloric element, thereby forming a heat exchange circuit;

the cold end heat exchanger: the cold end liquid outlet pipe of the barocaloric element is connected with a liquid inlet of the cold end heat exchanger, and a liquid outlet of the cold end heat exchanger is connected with the cold end liquid inlet pipe of the barocaloric element, thereby forming a heat exchange circuit.

The solid refrigerant is carborane material, $NaPF_6$, $KPF_6$, $NaSbF_6$ or $KSbF_6$, the operating temperature of the solid refrigerant is ambient temperature, and driving pressure applied is 0.1 MPa-400 MPa. The heat exchange fluid is anti-wear hydraulic oil.

The barocaloric element is made of high pressure resistant stainless steel; the bottom of the tubular structure is sealed, and the top end is provided with a removable cavity upper cover; the solid refrigerant is placed inside the cylindrical cavity body; the hot end liquid outlet pipe, the cold end liquid outlet pipe, the hot end liquid inlet pipe and the cold end liquid inlet pipe of the barocaloric element are provided with sealing filter screens which can prevent the position of the solid refrigerant from moving in the pressurization process and can also prevent the debris generated by the collision between the solid refrigerants from flowing away with the fluid and blocking a pipeline; the top end of the tubular structure and the cavity upper cover are sealed by a rubber ring to prevent the pressurization oil from flowing out of the cylindrical cavity body; and the whole barocaloric element is fixedly placed on a plane in the operation process of the system.

The hot end liquid outlet pipe of the barocaloric element is also provided with a hydraulic pump, so that the heat exchange fluid in the barocaloric element flows into the hot end heat exchanger under the action of the hydraulic pump, the heat exchange fluid in the hot end heat exchanger is pushed to flow into the barocaloric element, and the cycle process continues. The cold end liquid outlet pipe of the barocaloric element is also provided with a hydraulic pump, so that the heat exchange fluid in the barocaloric element flows into the cold end heat exchanger under the action of the hydraulic pump, the heat exchange fluid in the cold end heat exchanger is pushed to flow into the barocaloric element, and the cycle process continues.

The cold end heat exchanger comprises a cubic cavity body I and heat exchange pipelines I in the cavity body I; the heat exchange pipelines I are arranged in a U-shape; the heat exchange pipelines I are connected with the liquid inlet and the liquid outlet of the cold end heat exchanger respectively; a plurality of plate interlayers are arranged in the cavity body I (items to be refrigerated can be placed on the plate interlayers), and the heat exchange pipelines I are arranged in the plate interlayers; a temperature sensor is installed on the top end of the cubic cavity body I for feeding the temperature in the cavity body I back to a control system in real time.

The hot end heat exchanger comprises a cubic cavity body II and heat exchange pipelines II in the cavity body II; the heat exchange pipelines II are arranged spirally; and the heat exchange pipelines II are connected with the liquid inlet and the liquid outlet of the hot end heat exchanger respectively; a shell of the cavity body II is designed as a hollow structure to facilitate internal heat exchange; a fan is arranged at the top end of the cavity body II to facilitate the heat exchange with air by the hot end heat exchanger; and a temperature sensor is installed on the top end of the cavity body II for feeding the temperature in the cavity body II back to the control system in real time.

An electric control cabinet comprises a PLC control module (control system), and the pressure control valves and the temperature sensors are electrically connected with the PLC control module; and the electric control cabinet is used for controlling the opening and closing of the pressure control valves and flow regulation, and monitoring the temperature information of the heat exchange fluid in the barocaloric element transmitted by the temperature sensors in real time.

The present invention has the following advantages:

1. In the refrigerating machine of the present invention, the phenomena of heat release after pressurization and heat absorption after depressurization are generated due to phase change through a barocaloric medium under the action of the high-pressure injection pump. The heat exchange fluid flows back and forth between the barocaloric refrigerators and exchanges heat and cold.

2. The high-precision high-pressure electric injection pump in the present invention provides pressure for the barocaloric refrigeration cycle, and the pressure is constantly output. The pressurization form is fluid pressure, which well overcomes the defect of uneven transfer of mechanical pressure. The pressurization oil is also used as the heat exchange fluid and in direct contact with the refrigerator. Pressure-driven heat and cold are directly brought into the hot end heat exchanger and the cold end heat exchanger to complete the cycle, thereby reducing the heat loss.

3. The refrigerating machine of the present invention is matched with the electric control cabinet, the pressure control valves and the temperature sensors, so that the barocaloric refrigerating machine in the present invention has the advantages of intelligent regulation, convenient operation and the like. When the heat exchange fluid in the refrigerating machine circulates in the pipeline due to pressure drive, the temperature sensors and pressure control valves transmit the corresponding signals to the electric control cabinet to realize real-time monitoring of temperature and pressure, and control the valves to be turned on and off according to the set program. The barocaloric material (refrigerator) inside the barocaloric element is pressurized and depressurized through the high-precision high-pressure electric injection pump to produce a barocaloric phenomenon, thereby achieving the process of refrigeration cycle.

In the figures: 1—electric injection pump; 11—oil filling pipe; 2—barocaloric element; 21—cavity upper cover; 22—cylindrical cavity body; 23—cold end liquid outlet pipe; 24—cold end liquid inlet pipe; 25—oil inlet; 26—hot end liquid inlet pipe; 27—hot end liquid outlet pipe; 3—cold end heat exchanger; 31—liquid outlet of cold end heat exchanger; 32—heat exchange pipeline I; 33—liquid inlet of cold end heat exchanger; 34—cavity body I; 4—hot end heat exchanger; 41—cavity body II; 42—heat exchange pipeline II; 43—fan; 5—electric control cabinet; 6—pressure control valve; 7—temperature sensor.

DETAILED DESCRIPTION

In order to further understand the present invention, the present invention is described below in combination with examples, but the examples are only used for further elaboration of the characteristics and the advantages of the present invention, rather than limitations to the claims of the present invention.

Figure 1:
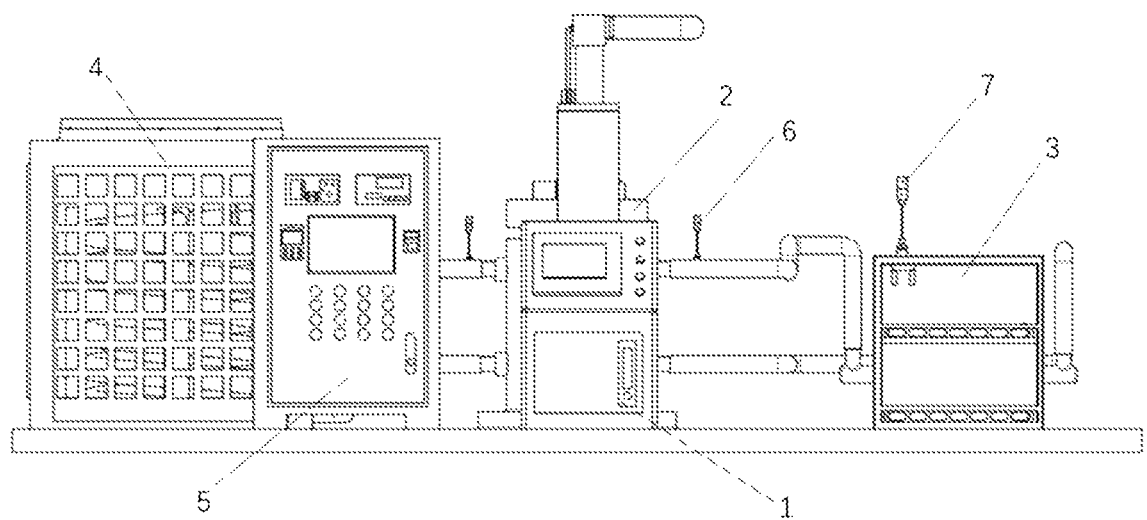
FIG. 1 is an overall structural schematic diagram of a barocaloric refrigerating machine based on a barocaloric effect in the present invention.
Figure 2:
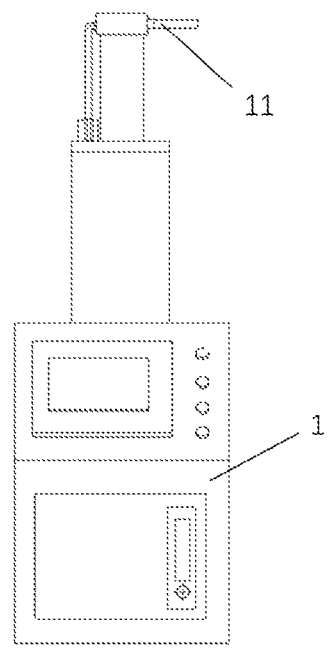
FIG. 2 is a structural schematic diagram of a high-precision high-pressure electric injection pump in a barocaloric refrigerating machine of the present invention.

The present invention provides a ambient temperature barocaloric refrigerating machine based on a barocaloric effect, as shown in FIG. 1. The barocaloric refrigerating machine comprises a high-precision high-pressure electric injection pump 1, a barocaloric element 2, heat exchange fluid, a cold end heat exchanger 3 and a hot end heat exchanger 4. The structure of each part is specifically as follows:

As shown in FIG. 2, the high-precision high-pressure electric injection pump (Beijing Easy Materials Technology Co., Ltd., HP350A) is used for providing constant pressure for the barocaloric element 2; and an oil filling pipe 101 at the upper end of the electric injection pump 1 is connected with an oil inlet 25 in the barocaloric element for injecting pressurization oil into a cavity body of the barocaloric element.

Figure 3:
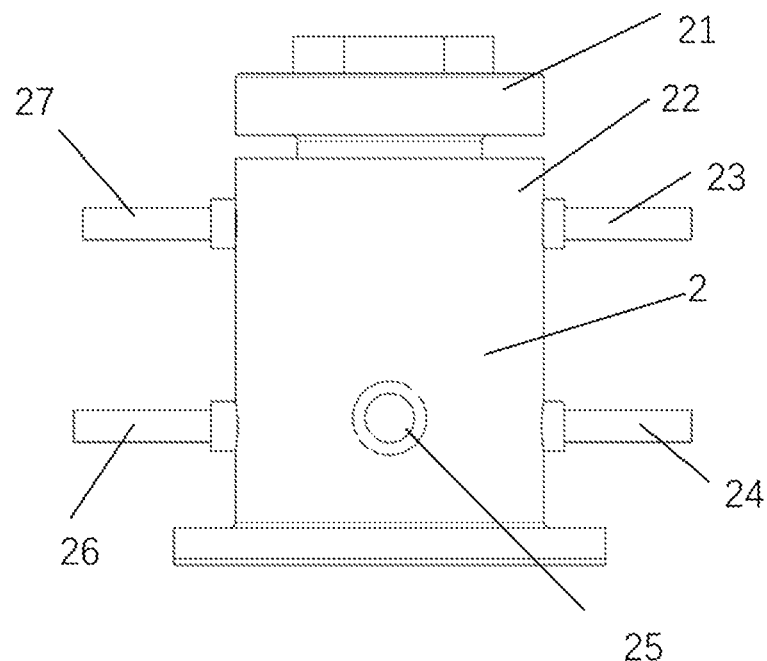
FIG. 3 is a structural schematic diagram of a barocaloric element in a barocaloric refrigerating machine of the present invention.

As shown in FIG. 3, the barocaloric element is a tubular structure having a cylindrical cavity body 22; a solid refrigerant is arranged in the cavity body; the upper part of a side wall of the tubular structure is provided with a hot end liquid outlet pipe 27 and a cold end liquid outlet pipe 23; the lower part of the side wall of the tubular structure is provided with a hot end liquid inlet pipe 26 and a cold end liquid inlet pipe 24; and the middle part of the side wall is provided with an oil inlet 25; the pressurization oil filled from the oil inlet is also used as the heat exchange fluid and in direct contact with the solid refrigerant. The hot end liquid outlet pipe, the cold end liquid outlet pipe, the hot end liquid inlet pipe and the cold end liquid inlet pipe are provided with pressure control valves 6 for controlling fluid switching and fluid flow regulation. The barocaloric element is made of high pressure resistant stainless steel; the bottom of the tubular structure is sealed, and the top end is provided with a removable cavity upper cover 21; the top end of the tubular structure and the cavity upper cover 201 are sealed by a rubber ring to prevent the pressurization oil from flowing out of the cylindrical cavity body 22; the hot end liquid outlet pipe, the cold end liquid outlet pipe, the hot end liquid inlet pipe and the cold end liquid inlet pipe of the barocaloric element are provided with sealing filter screens which can prevent the position of the solid refrigerant from moving in the pressurization process and can also prevent the debris generated by the collision between the solid refrigerants from flowing away with the fluid and blocking a pipeline; and the whole barocaloric element is fixedly placed on a plane in the operation process of the system. The hot end liquid outlet pipe of the barocaloric element is provided with a hydraulic pump, so that the heat exchange fluid in the barocaloric element flows into the hot end heat exchanger under the action of the hydraulic pump, the heat exchange fluid in the hot end heat exchanger is pushed to flow into the barocaloric element, and the cycle process continues. The cold end liquid outlet pipe of the barocaloric element is provided with a hydraulic pump, so that the heat exchange fluid in the barocaloric element flows into the cold end heat exchanger under the action of the hydraulic pump, the heat exchange fluid in the cold end heat exchanger is pushed to flow into the barocaloric element, and the cycle process continues.

Figure 4:
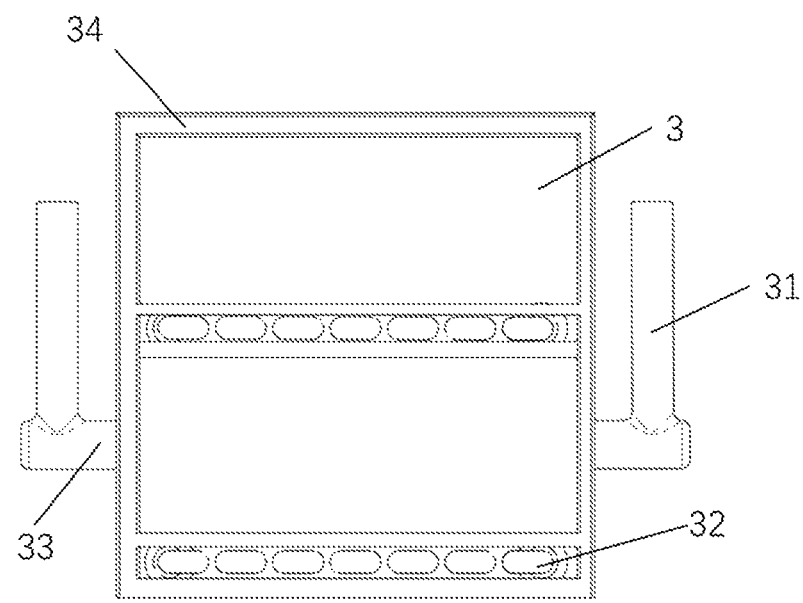
FIG. 4 is a structural schematic diagram of a cold end heat exchanger in a barocaloric refrigerating machine of the present invention.

As shown in FIG. 4, the cold end heat exchanger 3 comprises a cubic cavity body I 34 and heat exchange pipelines I 32 in the cavity body I; the heat exchange pipelines I 32 are arranged in a U-shape; the heat exchange pipelines I are connected with the liquid inlet 33 of the cold end heat exchanger and the liquid outlet 31 of the cold end heat exchanger respectively; and the liquid inlet 33 of the cold end heat exchanger and the liquid outlet 31 of the cold end heat exchanger are communicated with the cold end liquid outlet pipe and the cold end liquid inlet pipe of the barocaloric element respectively, thereby forming a heat exchange circuit. A plurality of plate interlayers are arranged in the cavity body I (items to be refrigerated can be placed on the plate interlayers), and the heat exchange pipelines I are arranged in the plate interlayers; and a temperature sensor 7 is installed on the top end of the cubic cavity body I for feeding the temperature in the cavity body I back to a control system in real time.

Figure 5:
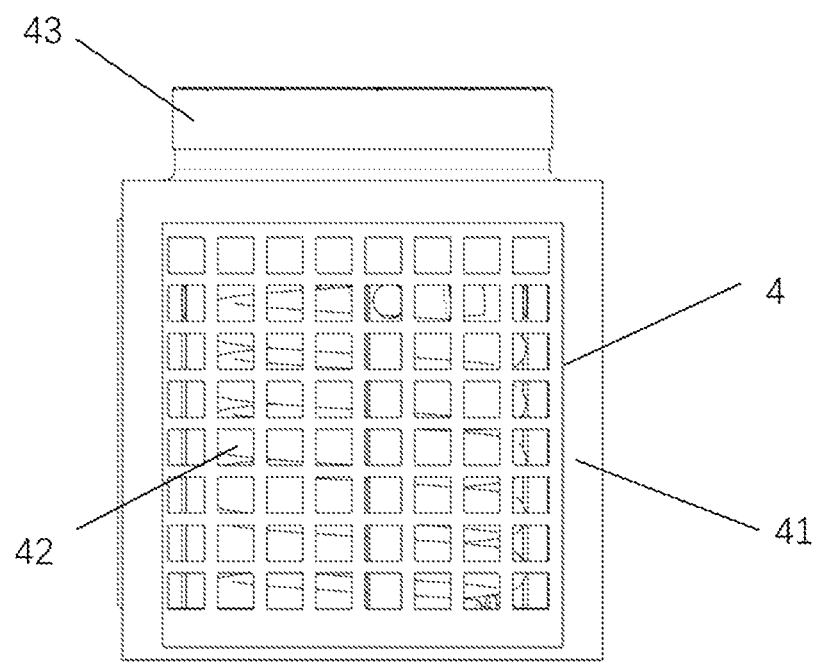
FIG. 5 is a structural schematic diagram of a hot end heat exchanger in a barocaloric refrigerating machine of the present invention.
Figure 6:
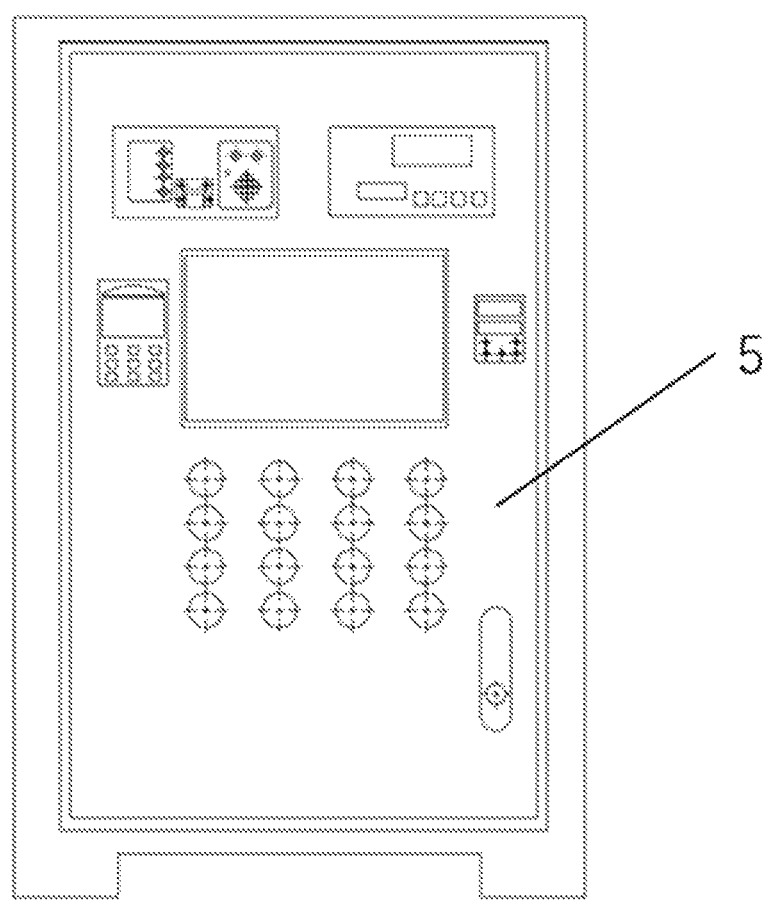
FIG. 6 is a structural schematic diagram of an electric control cabinet in a barocaloric refrigerating machine of the present invention.

As shown in FIG. 5, the hot end heat exchanger 4 comprises a cubic cavity body II 41 and heat exchange pipelines II 42 in the cavity body II; the heat exchange pipelines II are arranged spirally; the heat exchange pipelines II are connected with the liquid inlet and the liquid outlet of the hot end heat exchanger respectively; the liquid inlet and the liquid outlet are connected with the hot end liquid outlet pipe and the hot end liquid inlet pipe of the barocaloric element respectively, thereby forming a heat exchange circuit. a shell of the cavity body II is designed as a hollow structure to facilitate internal heat exchange; a fan 43 is arranged at the top end of the cavity body II to facilitate the heat exchange with air by the hot end heat exchanger; and a temperature sensor is installed on the top end of the cavity body II for feeding the temperature in the cavity body II back to the control system in real time.

The ambient temperature barocaloric refrigerating machine of the present invention further comprises an electric control cabinet 5; the electric control cabinet comprises a PLC control module (control system), and the pressure control valves 6 and the temperature sensors 7 are electrically connected with the PLC control module; and the electric control cabinet is used for controlling the opening and closing of the pressure control valves and flow regulation, and monitoring the temperature information of the heat exchange fluid in the barocaloric element transmitted by the temperature sensors in real time.

In the present invention, the solid refrigerant adopts the material that can achieve the refrigeration effect based on the barocaloric effect under normal temperature conditions, e.g., preferably carborane material, $NaPF_6$, $KPF_6$, $NaSbF_6$ or $KSbF_6$; the operating temperature is ambient temperature, and driving pressure applied is 0.1 MPa-400 MPa. The used heat exchange fluid is anti-wear hydraulic oil.

The operating process of the barocaloric refrigerating machine of the present invention is as follows:

The driving pressure value of the high-precision high-pressure injection pump 1 is set according to the driving pressure and the refrigeration interval of the used solid refrigerant under normal temperature conditions. The oil filling pipe 11 at the upper part of the high-precision high-pressure injection pump 1 pumps the heat exchange fluid at normal temperature into the barocaloric element 2, the hot end heat exchanger 3 and the cold end heat exchanger 4 through the oil inlet 25 of the barocaloric element until all the refrigerants in the barocaloric element are covered by the heat exchange fluid.

At the beginning of the cycle, firstly, the pressure control valves among the barocaloric element 2, the hot end heat exchanger 3 and the cold end heat exchanger 4 are closed. The refrigerant in the barocaloric element 2 is pressurized by the high-precision high-pressure injection pump until the phase change pressure is reached. At this time, the phase change temperature of the barocaloric material rises. At this time, the heat exchange fluid in the barocaloric element 2 and the refrigerant exchange the heat, and the temperature rises. After the heat exchange is completed and the fluid temperature in the whole cavity body rises to remain stable, the pressure control valve 6 between the barocaloric element 2 and the hot end heat exchanger 3 is turned on; and the liquid pump connected between the barocaloric element 2 and the hot end heat exchanger 3 is turned on so that the high temperature fluid in the barocaloric element 2 flows into the hot end heat exchanger 3 under the action of the pump, and exchanges heat with the external environment under the action of the top fan. The normal temperature fluid in the hot end heat exchanger 3 is pushed to flow into the barocaloric element 2. This cycle process continues until the fluid temperature in two cavity bodies is consistent and returns to ambient temperature.

At this time, the pressure control valve between the barocaloric element 2 and the hot end heat exchanger 3 is turned off, and the pressure in the barocaloric element 2 is reduced to normal pressure by the high-precision high-pressure injection pump 1. At this time, after depressurization, the barocaloric material absorbs the heat and the temperature decreases. After the heat transfer is completed and the fluid temperature in the whole cavity body decreases to remain stable, the pressure control valve between the barocaloric element 2 and the cold end heat exchanger is turned on; and the liquid pump connected between the barocaloric element 2 and the cold end heat exchanger 4 is turned on so that the low temperature fluid in the barocaloric element 2 flows into the cold end heat exchanger 4 under the action of the pump, and the cold is transmitted to loads (the items placed on the plate interlayers). The normal temperature fluid in the cold end heat exchanger 4 flows into the barocaloric element 2. This cycle continues until the temperature at both ends returns to ambient temperature. The heat exchange cycle at left and right ends is conducted continuously and alternately, so that the temperature of the cold end load can be continuously decreased until the expected cooling temperature is reached.

The invention claimed is:

1. An ambient temperature barocaloric refrigerating machine comprising:
    an electric injection pump,
    a barocaloric element,
    a heat exchange fluid,
    a cold end heat exchanger, and
    a hot end heat exchanger; wherein:
        the barocaloric element is a tubular structure having a cylindrical cavity body; a solid refrigerant is arranged in the cylindrical cavity body; an upper part of a side wall of the tubular structure is provided with a hot end liquid outlet pipe and a cold end liquid outlet pipe; a lower part of the side wall is provided with a hot end liquid inlet pipe and a cold end liquid inlet pipe; and a middle part of the side wall is provided with an oil inlet, wherein: the hot end liquid outlet pipe, the cold end liquid outlet pipe, the hot end liquid inlet pipe and the cold end liquid inlet pipe are provided with pressure control valves;
        the electric injection pump is adapted to provide a constant pressure for the barocaloric element; an oil filling pipe at the upper end of the injection pump is connected with the oil inlet in the barocaloric element for injecting pressurization oil into the cylindrical cavity body of the barocaloric element; the pressurization oil serves as the heat exchange fluid and in direct contact with the solid refrigerant;
        the hot end liquid outlet pipe of the barocaloric element is connected with a liquid inlet of the hot end heat exchanger, and a liquid outlet of the hot end heat exchanger is connected with the hot end liquid inlet pipe of the barocaloric element, thereby forming a first heat exchange circuit;
        the cold end liquid outlet pipe of the barocaloric element is connected with a liquid inlet of the cold end heat exchanger, and a liquid outlet of the cold end heat exchanger is connected with the cold end liquid inlet pipe of the barocaloric element, thereby forming a second heat exchange circuit.

2. The ambient temperature barocaloric refrigerating machine based on the barocaloric effect according to claim 1, wherein the solid refrigerant is carborane material, $NaPF_6$, $KPF_6$, $NaSbF_6$ or $KSbF_6$, the operating temperature of the solid refrigerant is ambient temperature, and a driving pressure applied is 0.1 MPa-400 MPa.

3. The ambient temperature barocaloric refrigerating machine based on the barocaloric effect according to claim 1, wherein the barocaloric element is made of a high pressure resistant stainless steel; the bottom of the tubular structure is sealed, and the top end of the tubular structure is provided with a removable cavity upper cover; the solid refrigerant is placed inside the cylindrical cavity body; the hot end liquid outlet pipe, the cold end liquid outlet pipe, the hot end liquid inlet pipe and the cold end liquid inlet pipe of the barocaloric element are each provided with sone or more ealing filter screens; the top end of the tubular structure and the cavity upper cover are sealed by a rubber ring to prevent the pressurization oil from flowing out of the cylindrical cavity body; and the whole barocaloric element is fixedly placed on a plane in the operation process of the system.

4. The ambient temperature barocaloric refrigerating machine based on the barocaloric effect according to claim 1, wherein the hot end liquid outlet pipe of the barocaloric element is provided with a first hydraulic pump, so that the heat exchange fluid in the barocaloric element flows into the hot end heat exchanger, driven by the first the hydraulic pump, and the heat exchange fluid in the hot end heat exchanger is driven into the barocaloric element; and
    the cold end liquid outlet pipe of the barocaloric element is provided with a second hydraulic pump, so that the heat exchange fluid in the barocaloric element flows into the cold end heat exchanger driven by the second hydraulic pump, the heat exchange fluid in the cold end heat exchanger is driven into the barocaloric element.

5. The ambient temperature barocaloric refrigerating machine based on the barocaloric effect according to claim 1, wherein the cold end heat exchanger comprises a cubic cavity body I and heat exchange pipelines I in the cubic cavity body I; the heat exchange pipelines I are arranged in a U-shape; the heat exchange pipelines I are connected with the liquid inlet and the liquid outlet of the cold end heat exchanger respectively; a plurality of plate interlayers are arranged in the cubic cavity body I, and the heat exchange pipelines I are arranged in the plate interlayers; a temperature sensor is installed on the top end of the cubic cavity body I for feeding the temperature in the cubic cavity body I back to a control system in real time.

6. The ambient temperature barocaloric refrigerating machine based on the barocaloric effect according to claim 5, wherein an electric control cabinet comprises a PLC control module (control system), and the pressure control valves and the temperature sensors are electrically connected with the PLC control module; and the electric control cabinet is adapted to control the opening and closing of the pressure control valves and flow regulation, and monitoring the temperature information of the heat exchange fluid in the barocaloric element transmitted by the temperature sensors in real time.

7. The ambient temperature barocaloric refrigerating machine based on the barocaloric effect according to claim 1, wherein the hot end heat exchanger comprises a cubic cavity body II and heat exchange pipelines II in the cubic cavity body II; the heat exchange pipelines II are arranged spirally; the heat exchange pipelines II are connected with the liquid inlet and the liquid outlet of the hot end heat exchanger respectively; a shell of the cubic cavity body II is designed as a hollow structure to facilitate internal heat exchange; a fan is arranged at the top end of the cubic cavity body II to facilitate the heat exchange with air by the hot end heat exchanger; and a temperature sensor is installed on the top end of the cavity body II for feeding the temperature in the cubic cavity body II back to the control system in real time.

8. The ambient temperature barocaloric refrigerating machine based on the barocaloric effect according to claim 1, wherein the heat exchange fluid is an anti-wear hydraulic oil.

* * * * *